United States Patent [19]

Tanaka et al.

[11] Patent Number: 5,370,970
[45] Date of Patent: Dec. 6, 1994

[54] WRITE-ONCE-READ-MANY OPTICAL DISK

[75] Inventors: Satoru Tanaka; Takashi Chuman; Yasushi Araki, all of Saitama, Japan

[73] Assignee: Pioneer Electronic Corporation, Tokyo, Japan

[21] Appl. No.: 93,138

[22] Filed: Jul. 19, 1993

Related U.S. Application Data

[63] Continuation of Ser. No. 802,537, Dec. 5, 1991, abandoned.

[30] Foreign Application Priority Data

Jun. 6, 1991 [JP] Japan .................. 3-134802

[51] Int. Cl.$^5$ .................. G11B 7/013; G03C 1/00
[52] U.S. Cl. .................. 430/273; 430/495; 430/945; 430/275; 369/288; 369/284; 369/275.1; 346/135.1
[58] Field of Search .......... 430/495, 945, 273, 270, 430/275; 346/135.1, 766; 369/284, 288, 275.1, 295.4

[56] References Cited

U.S. PATENT DOCUMENTS

| | | | |
|---|---|---|---|
| 4,600,625 | 7/1986 | Abe et al. | 430/945 |
| 4,752,554 | 6/1988 | Sato et al. | 430/945 |
| 4,767,693 | 8/1988 | Oba et al. | 430/945 |
| 4,944,967 | 7/1990 | Yabe et al. | 430/495 |
| 4,944,980 | 7/1990 | Akutsu et al. | 369/288 |
| 4,954,380 | 9/1990 | Kanome et al. | 369/275.1 |
| 5,008,401 | 4/1991 | Utsunomiya et al. | 548/455 |
| 5,075,147 | 12/1991 | Utami et al. | 346/135.1 |
| 5,080,946 | 1/1992 | Takagisi et al. | 346/135.1 |
| 5,185,233 | 2/1993 | Santo | 430/945 |

FOREIGN PATENT DOCUMENTS

| | | | |
|---|---|---|---|
| 63-303793 | 12/1988 | Japan | 369/275.1 |
| 1224948 | 9/1989 | Japan | 369/284 |
| 1287843 | 11/1989 | Japan | 369/284 |
| 2128338 | 5/1990 | Japan | 369/275.1 |
| 2084786 | 4/1982 | United Kingdom | 369/284 |
| 2165658 | 4/1986 | United Kingdom | 346/135.1 |

OTHER PUBLICATIONS

Patent Abstracts of Japan, unexamined applications, P field, vol. 15, No. 435, (P-1272) Nov. 6, 1991, The Patent Office Japanese Government, p. 162, Kokai No. 03-183 042.

Patent Abstracts of Japan, unexamined applications, P field, vol. 15, No. 316 (P-1237), Aug. 13, 1991, The Patent Office Japanese Government, p. 140, Kokai No. 03-113 846.

(List continued on next page.)

Columbus, Ohio, USA TKD Corp., "Optical recording materials", p. 597, Col. 1, Abstract-No. 158 222h.

Chemical Abstracts, vol. 105, No. 2, Jul. 14, 1986, Columbus, Ohio, USA, Hiroshi Ozawa et al, "Semi-conductor laser-sensitive optical recording medium", p. 600, Col. 2, Abstract-No. 15 344a.

Patent Abstracts of Japan, unexamined applications, P field, vol. 13, No. 428, (P-936), Sep. 25, 1989, The Patent Office Japanese Government, p. 30, Kokai No. 01-159 842.

*Primary Examiner*—Charles L. Bowers, Jr.
*Assistant Examiner*—Martin J. Angebranndt
*Attorney, Agent, or Firm*—Sughrue, Mion, Zinn, Macpeak & Seas

[57] ABSTRACT

A WORM optical disk that not only has a sufficiently improved reflectance to permit the setting of higher RF signal levels but that also permits the setting of higher levels for the tracking error signals to insure consistent performance in operation. This WORM optical disk of the present invention comprises a substrate 1 that has grooves 2 formed in its surface and that is coated with a dye film 3 which, in turn, is coated with a reflecting film 4, wherein the part of the dye film 3 which is formed on the lands 5 of the substrate 1 and a portion of that part of the dye film 3 which is formed in the grooves 2 are subjected to irradiation to effect color fading in the irradiated dye regions.

14 Claims, 2 Drawing Sheets

OTHER PUBLICATIONS

Patent Abstracts of Japan, unexamined applications, P field, vol. 15, No. 44, (P-1161), Feb. 4, 1991, The Patent Office Japanese Government, p. 107, Kokai No. 02-278 519.

Patent Abstracts of Japan, unexamined applications, P field, vol. 13, No. 426, (P-935), Sep. 22, 1989, The Patent Office Japanese Government, p. 111, Kokai No. 01-158 640.

Patent Abstracts of Japan, unexamined applications, P field, vol. 8, No. 105, (P-274), May 17, 1984, The Patent Office Japanese Government, p. 15, Kokai No. 59-14 150.

Patent Abstracts of Japan, unexamined applications, P field, vol. 13, No. 428, (P-936), Sep. 25, 1989, The Patent Office Japanese Government, p. 29, Kokai No. 01-159 840.

Patent Abstracts of Japan, unexamined applications, P field, vol. 12, No. 90, (P-679), Mar. 24, 1988, The Patent Office Japanese Government, p. 111, Kokai No. 62-223 828.

Chemical Abstracts, vol. 105, No. 4, Jul. 28, 1986, Columbus, Ohio, USA, Yutaka Ueda et al. "Optical information recording materials", p. 601, Col. 2, Abstract-No. 33 071p.

Chemical Abstracts, vol. 105, No. 8, Aug. 25, 1986, Columbus, Ohio, USA Hideaki Oba et al "Optical recording material containing cyanine dye.", p. 652, Col. 1, Abstract-No. 70 236s.

Chemical Abstracts, vol. 105, No. 16, Oct. 20, 1986, Columbus, Ohio, USA, Hideaki Oba et al, "Optical information recording materials", p. 659, Col. 1, Abstract-No. 143 645m.

Chemical Abstracts, vol. 102, No. 18, May 6, 1985, Columbus, Ohio, USA, Ricoh Co., Ltd., "Laser recording and readout process", p. 596, Co. 2, Abstract-No. 158 216j.

Chemical Abstracts, vol. 102, No. 18, May 6, 1985,

WRITE-ONCE-READ-MANY OPTICAL DISK

This is a continuation of application Ser. No. 07/802,537 filed Dec. 5, 1991, now abandoned.

BACKGROUND OF THE INVENTION

1. Field of the Invention

The present invention relates to write-once-read-many (hereinafter sometimes abbreviated as "WORM") optical disks. More particularly, it relates to WORM optical disks that have a sufficiently improved reflectance to permit the setting of higher RF signal levels and that also permit the setting of higher levels for the tracking error signal to insure consistent performance in operation.

2. Description of the Related Art

In optical recording media, it is known to form tracking grooves on the substrate surface at a prescribed pitch so as to enable accurate tracking by a laser beam for the optical recording and reproduction of data.

A typical construction of a conventional WORM optical disk, in particular, is explained with reference to FIG. 5. As depicted in FIG. 5, a substrate 101 has tracking grooves 100 formed into its surface. The grooved substrate surface is coated with a dye film 102 and typically over the entire surface of the grooved portion of the substrate. In any event, dye film 102 is, in turn, overcoated with a reflecting film 103.

One of the representative methods for detecting tracking servo control signals in such a conventional WORM optical disk is the push-pull method, which is commonly used in the the field. According to the push-pull method, the diffraction of light by the grooves is compared with that by the pits and the difference in the amount of diffracted light is used as an index for the detection of a tracking error. However, problems are encountered with the conventional WORM optical disks insofar as proper detection of servo control signals.

For instance, in the conventional WORM optical disk of the construction shown in FIG. 5, the dye film 102 is formed beneath the entire surface of the reflecting film 103. As a result, the light incident on the opposite side of the substrate must also be transmitted through dye film 102 which tends to distort the optical characteristics of the light transmitted to and reflected from reflecting film 103. This problem has caused difficulty in the setting high RF tracking signal levels. Other problems encountered with conventional WORM optical disks involving the detection of tracking servo control signals by the push-pull method are insufficiency in reflectance and possible variations in the intensity of diffracted light.

Further, WORM optical disks of the conventional structure have suffered from the disadvantage that a relative decrease in the level of tracking error signals is experienced at high RF signal level settings.

SUMMARY OF THE INVENTION

An object of the present invention is to provide a WORM optical disk that has a sufficiently improved reflectance to permit the setting of higher RF signal levels.

Another object of the present invention is to provide a WORM optical disk that permits the setting of higher RF signal levels for monitoring the tracking error signal to insure consistent performance in operation.

These and other objects of the present invention can be attained by a WORM optical disk comprising a substrate having tracking grooves formed in the surface of the substrate, and the grooves are coated with a dye film which, in turn, is coated with a reflecting film, wherein the part of the dye film which is formed on the lands of the substrate and a portion of that part of the dye film which is formed in the grooves are subjected to an irradiation treatment to effect color fading or bleaching in the exposed regions of the dye film.

In the WORM optical disk of the present invention, that part of the dye film disposed on the substrate as formed on the lands, or those areas which are defined by adjacent grooves in the surface of the substrate, as well as a portion of that part of the dye film which is formed in the grooves are subjected to the irradiation treatment to effect the color fading in the exposed dye film areas.

As a result, the irradiated dye in the dye film portions provided over the lands of the substrate is sufficiently reduced in light absorbance to provide a higher light transmittance. As a consequence, the reflectance of light from the reflecting film situated over the lands and over irradiated parts of the dye film thereunder is improved enough to enable the setting of a higher RF signal level.

Further, the portion of the dye film formed in the grooves which is irradiated becomes color faded or bleached and, as a consequence, the depth of the grooves can be reduced to enhance the intensity of diffracted light and, hence, the level of tracking error signals.

In the present invention, a source of radiation is selected which can effect fading or bleaching of the organic dye present in the dye film. The fading or bleaching phenomenum is caused due to the decomposition of the organic dye in the recording layer when irradiated in sufficient intensity by a radiation source. The irradiation causes oxidation or breakage of a structural unit in the dye molecule related to color formation of the dye. As a result, a tracking region where irradiated faded dye is present will have improved reflectance which permits the setting of higher RF signal levels.

The invention itself, both as to its construction and its method of fabrication, together with additional objects and advantages thereof, will be better understood from the following description of preferred embodiments of the present invention when considered in conjunction with the accompanying drawings.

BRIEF DESCRIPTION OF THE DRAWINGS

In FIG. 1, the thickness of a reflecting film 4 is not shown for the sake of simplicity;

FIG. 3 shows the step of forming the dye film layer;

FIG. 4 shows an irradiation treatment for effecting the color fading of irradiated dye portions in the dye film.

DESCRIPTION OF THE PREFERRED EMBODIMENTS

Figure 1:
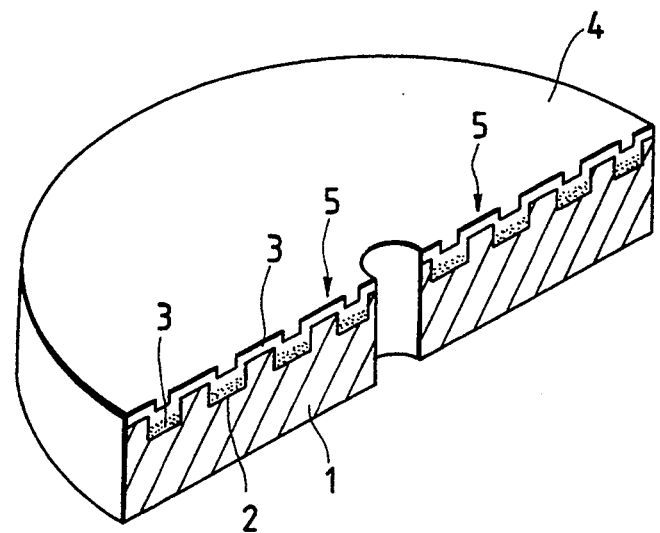
FIG. 1 is a perspective view showing a section of the WORM optical recording disk of the present invention.
Figure 2:
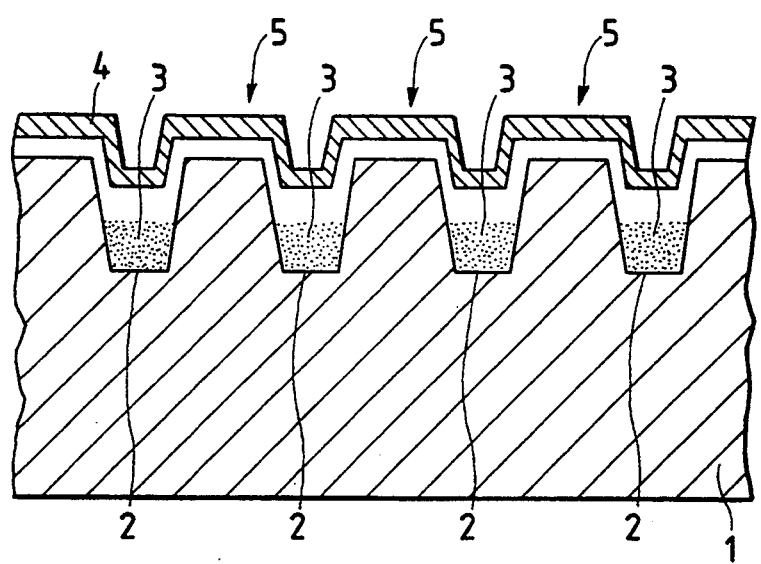
FIG. 2 is a cross-sectional view of the optical disk depicted in FIG. 1.

As shown in FIG. 2, the optical disk of the present invention comprises a light-transparent substrate 1 having grooves 2 formed on one surface, a dye film 3 formed on the entire surface of the substrate 1 including grooves 2, and a reflecting film 4 is formed over the dye film 3.

The substrate 1 generally may be formed of any materials that are transparent to light, as exemplified by resins such as polycarbonates (PC) and poly(methyl methacrylate) (PMMA), as well as optical glass. Among those substrate materials, resins such as PC and PMMA are particularly preferred.

In the case where the substrate 1 is formed of optical glass, it may be overlaid with a transfer layer (not shown) that has preliminarily formed grooves 2. The transfer layer may be formed of various materials including: photodegradable light-sensitive resins such as diazo resins having aromatic diazonium salts condensed by formaldehyde, and aromatic diazonium salt based resins having such diazo resins combined with polyvinyl alcohol, phenolic resins, and the like; photodimerized light-sensitive resins having cinnamyl groups introduced into side chains of linear polymers such as polyvinyl alcohol and acrylic resins; and uv curable resins (photopolymers, or simply abbreviated to 2P) such as photopolymerizable light-sensitive resins as exemplified by photoradical polymerized resin compositions comprising prepolymers of unsaturated polyesters, epoxy acrylates and urethane acrylates for binder polymers such as polyvinyl alcohol, polyamides and polymethacrylates, in combination with various acrylate or methacrylate monomers and photo-polymerization initiators.

The grooves 2 usually have a depth of about 0.04–0.4 μm.

The dye or recording film 3 comprises an organic dye or dye composition and can be formed by known coating methods, such as bar coating, blade coating, dip coating, spray coating, spin coating and the like.

The optimum thickness of the dye film will vary depending upon the type of dye used but may be generally about 500–2000Å.

Dyes that can be used in the dye film 3 include cyanine dyes, naphthoquinone dyes and phthalocyanine dyes. Among those dyes, cyanine dyes are preferred. Further, cyanine dyes of indolenine type are particularly preferred. Cyanine dyes of indolenine type have a cationic structure in which two nitrogenous hetero rings are bound together by a methine group or a chain of methine groups, and they have a maximum absorption at about 640–700 nm when dissolved in low-boiling organic solvents.

On the other hand, when indolenine type dyes are formed in thin films, these dyes have the peak of absorption curve shifted to the longer wavelength which closely approaches the wavelength of a high-power semiconductor laser (780 nm). Two specific examples of indolenine type cyanine dyes having these properties are represented by the following formulae (1) and (2):

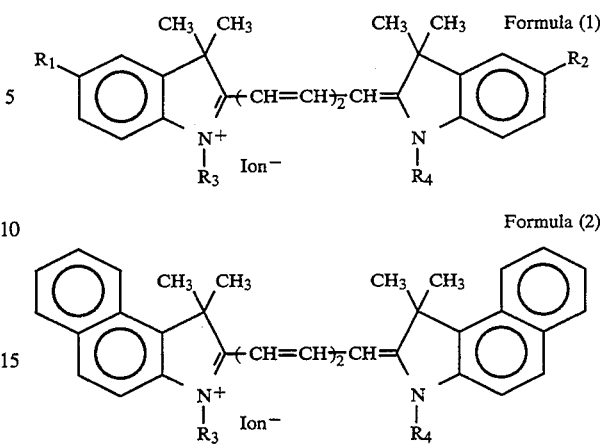

wherein $R_1$ and $R_2$ each represents hydrogen or halogen, and $R_3$ and $R_4$ each represents an alkyl group, for example, an alkyl group containing 1–10 carbon atoms, and Ion⁻ represents a counterion, for example, $ClO_4^-$, $Cl^-$, $Br^-$ and $I^-$.

These idolenine-type cyanine dyes can be used to form the dye film 3 disposed within grooves 2 and over lands 5 on the substrate 1 as shown in FIG. 2.

The dye film 3 is subjected to irradiation treatment to cause color fading or bleaching of the dye in a portion of the dye film part which is within the grooves 2 and in dye film parts located on the lands 5.

The light source used to irradiate and effect fading of the dye may comprise any number of energy beam sources which have a wavelength absorbable by the dye and dye film to cause a change in the optical characteristics thereof. For example light sources such as ultraviolet light, such as carbon, mercury-vapor, tungsten, xenon and Kronmeyer lamps emitting a wavelength around 300–400 nm; X-rays; electron and ion beams; and various lasers, such as semiconductor, gas, and solid lasers.

The intensity of the light needed to effect color fading of the dye is several tens mW.hour/cm² at the surface of the dye film depending on the particular energy beam source and particular dye involved.

Figure 3:
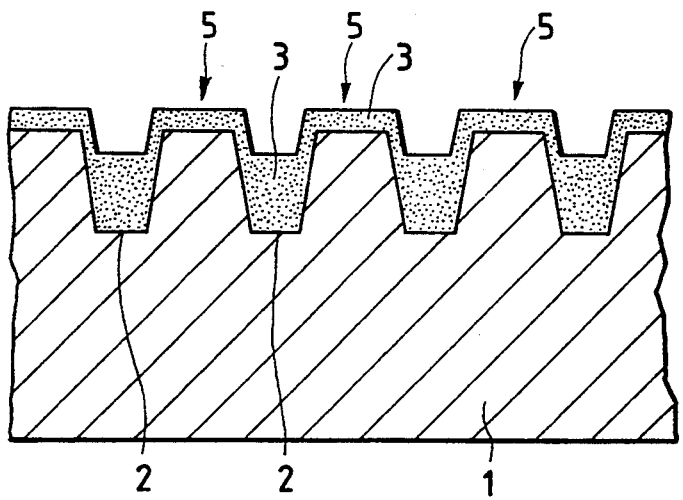
FIG. 3 is cross-sectional view of the optical disk of FIG. 1 but at an intermediate stage of a fabrication process used to make the WORM optical disk of the present invention. That is.
Figure 4:
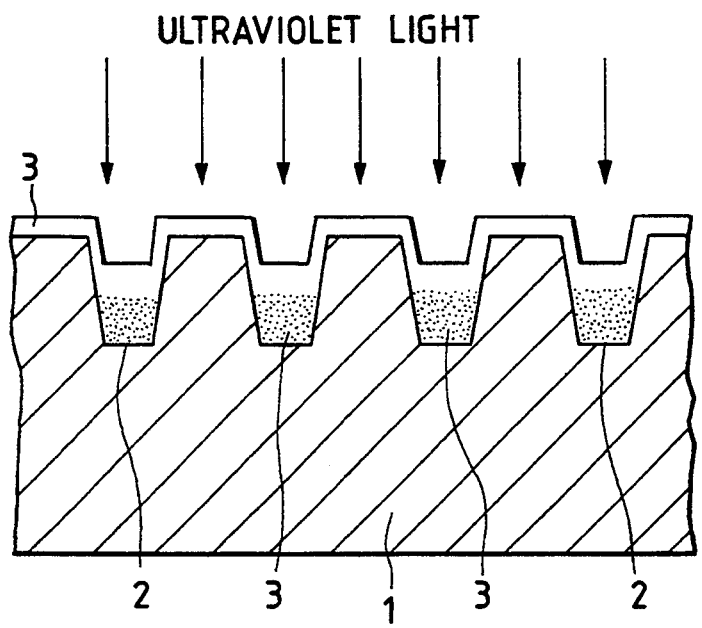
FIG. 4 is a cross-sectional view of the optical disk of FIG. 1 at an intermediate stage of a fabrication process for making the WORM optical disk which follows the stage depicted in FIG. 3. That is.
Figure 5:
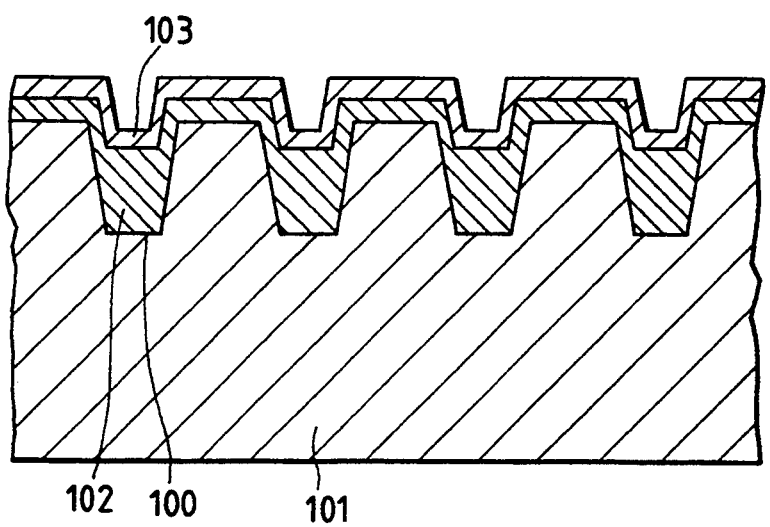
FIG. 5 is a cross-sectional view of a conventional WORM optical recording disk.

A method that can advantageously be employed to form the dye film 3 which is susceptible to fading in color in a portion of that part which is within the grooves 2 and in that part which is on top of the lands 5 comprises first coating a dye film over the entire surface of the substrate 1 as shown in FIG. 3. Then, a source of dye fading radiation such as ultraviolet light is scanned or projected at the dye film until a portion of that part of the dye film 3 which is within the grooves 2 and that part of the dye film which is on top of the lands 5 fade in color as shown in FIG. 4. In other words, as shown in FIG. 4, the recording layer can be considered to comprise two portions, a first portion and a second portion. The first portion comprises all of the recording layer above the lands, and the upper portion of the recording layer above the grooves. This upper portion of the recording layer above the grooves is adjacent the reflecting layer to be subsequently formed on the recording layer. The second portion of the recording layer comprises the lower part of the recording layer above the grooves which is adjacent the substrate. In accordance with the above-described selective irradiation, the first portion of the recording layer would be color faded, whereas the second portion of the recording layer would not be color faded, as shown in FIG. 4. Exposure can also be conducted through a mask to control those portions of the dye film overlying the grooves which are irradiated. However, irradiation preferably should not be so intense as to cause deformation of the dye film layer.

In this method, the amount of dye that should remain unfaded in the grooves 2 can be determined by setting appropriate conditions for illumination with the fading radiation such as ultraviolet light.

The reflecting film 4 is provided on top of the dye film 3. The reflecting film 4 may advantageously be formed of gold (Au) and it is formed over the dye film 3 by a suitable technique such as evaporation or sputtering. The reflecting film 4 thus formed typically has a thickness of about 0.03–3 μm.

Having the structural features described above, the present invention provides a write-once-read-many optical disk that not only has a sufficiently improved reflectance to permit the setting of higher RF signals but that also permits the setting of higher levels for the tracking error signals to insure consistent performance in operation.

While the invention has been described in detail and with reference to specific embodiments thereof, it will be apparent to one skilled in the art that various changes and modifications can be made therein without departing from the spirit and scope thereof.

What is claimed is:

1. A write-once-read-many optical disk having improved reflectance properties, comprising:
   a substrate having grooves and lands formed in a surface thereof;
   a recording layer comprising an organic dye on said substrate surface having said grooves and lands, said recording layer comprising a first portion and a second portion, said first portion comprising all of the recording layer above said lands, and a first part of the recording layer above said grooves, said first part being an area above said grooves which is adjacent a reflecting layer to be subsequently formed on said recording layer, said second portion comprising a second part of the recording layer above said grooves which is adjacent said substrate; and
   a reflecting layer on said recording layer;
   wherein said recording layer has been subjected to a selective irradiation treatment prior to forming said reflecting layer thereon, said irradiation treatment comprising irradiating the recording layer from a side opposite said substrate with an energy beam having a wavelength absorbable by the dye for a time sufficient to cause color fading of the dye in said first portion of the recording layer due to decomposition of the dye, but not in said second portion of the recording layer.

2. A write-once-read-many optical disk according to claim 1, wherein the recording layer is thicker in the areas above the grooves in the substrate relative to the areas above the lands in the substrate.

3. A write-once-read-many optical disk according to claim 1, wherein said substrate is a transparent substrate.

4. A write-once-read-many optical disk according to claim 1, wherein said organic dye is selected from the group consisting of cyanine dyes, napthoquinone dyes and phthalocyanine dyes.

5. A write-once-read-many optical disk according to claim 1, wherein said organic dye is an idolenic cyanine dye.

6. A write-once-read-many optical disk according to claim 5, wherein said indolenic cyanine dye is represented by either of the following formulae (1) or (2):

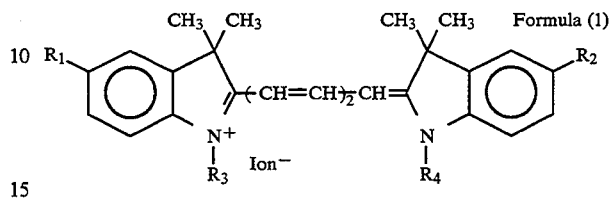

Formula (1)

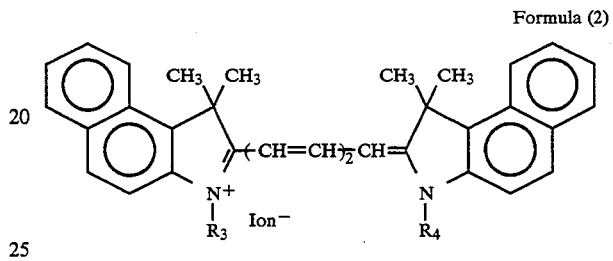

Formula (2)

wherein $R_1$ and $R_2$ each represents hydrogen or halogen, and $R_3$ and $R_4$ each represents an alkyl group having 1–10 carbon atoms, and $Ion^-$ represents a counterion.

7. A process for producing a write-once-read-many optical disk having improved reflectance properties, comprising the steps of
   (a) on a transparent substrate having grooves and lands formed in a surface thereof, forming a recording layer comprising an organic dye on said substrate surface having said grooves and lands, said recording layer comprising a first portion and a second portion, said first portion comprising all of the recording layer above said lands, and a first part of the recording layer above said grooves, said first part being an are above said grooves which is adjacent a reflecting layer to be subsequently formed on said recording layer, said second portion comprising a second part of the recording layer above said grooves which is adjacent said substrate,
   (b) selectively irradiating the recording layer from a side opposite said substrate with an energy beam having a wavelength absorbable by the dye for a time sufficient to cause color fading of the dye in said first portion of the recording layer due to decomposition of the dye, but not said second portion of the recording layer, and after step (b),
   (c) forming a reflecting layer on the recording layer.

8. A process for producing a write-once-read-many optical disk according to claim 7, wherein the recording layer is thicker in he areas above the grooves in the substrate relative to the areas above the lands in the substrate.

9. A process for producing a write-once-read-many optical disk according to claim 7, wherein said energy beam is ultraviolet light.

10. A process for producing a write-once-read-many optical disk according to claim 7, wherein said organic dye is selected from the group consisting of cyanine dyes, naphthoquinone dyes and phthalocyanine dyes.

11. A process for producing a write-once-read-many optical disk according to claim 7, wherein said organic dye is an indolenic cyanine dye.

12. A process for producing a write-once-read-many optical disk according to claim 11, wherein said indolenic cyanine dye is represented by either of the following formulae (1) or (2)

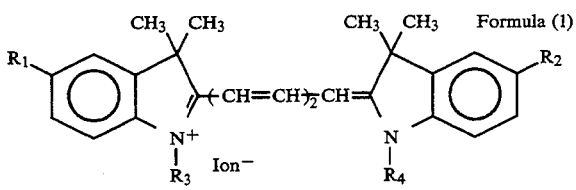

Formula (1)

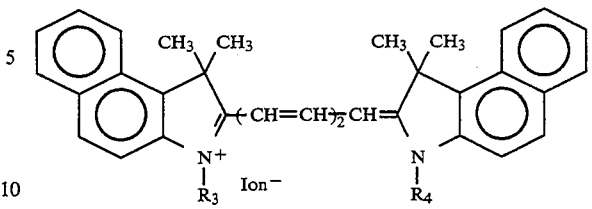

Formula (2)

wherein $R_1$ and $R_2$ each represents hydrogen or halogen, and $R_3$ and $R_4$ each represents an alkyl group having 1–10 carbon atoms, and $Ion^-$ represents a counterion.

13. A process for producing a write-once-read-many optical disk according to claim 7, wherein the step of forming the recording layer comprises coating the recording layer onto the lands and grooves in the surface of the transparent substrate.

14. A process for producing a WORM optical disk according to claim 7, wherein the step of forming said reflecting layer comprises depositing a Au layer on said recording layer.

* * * * *